O. A. GOOCH.
TREE FELLING DEVICE.
APPLICATION FILED APR. 3, 1914. RENEWED JULY 13, 1915.
1,154,624.
Patented Sept. 28, 1915.
2 SHEETS—SHEET 1.
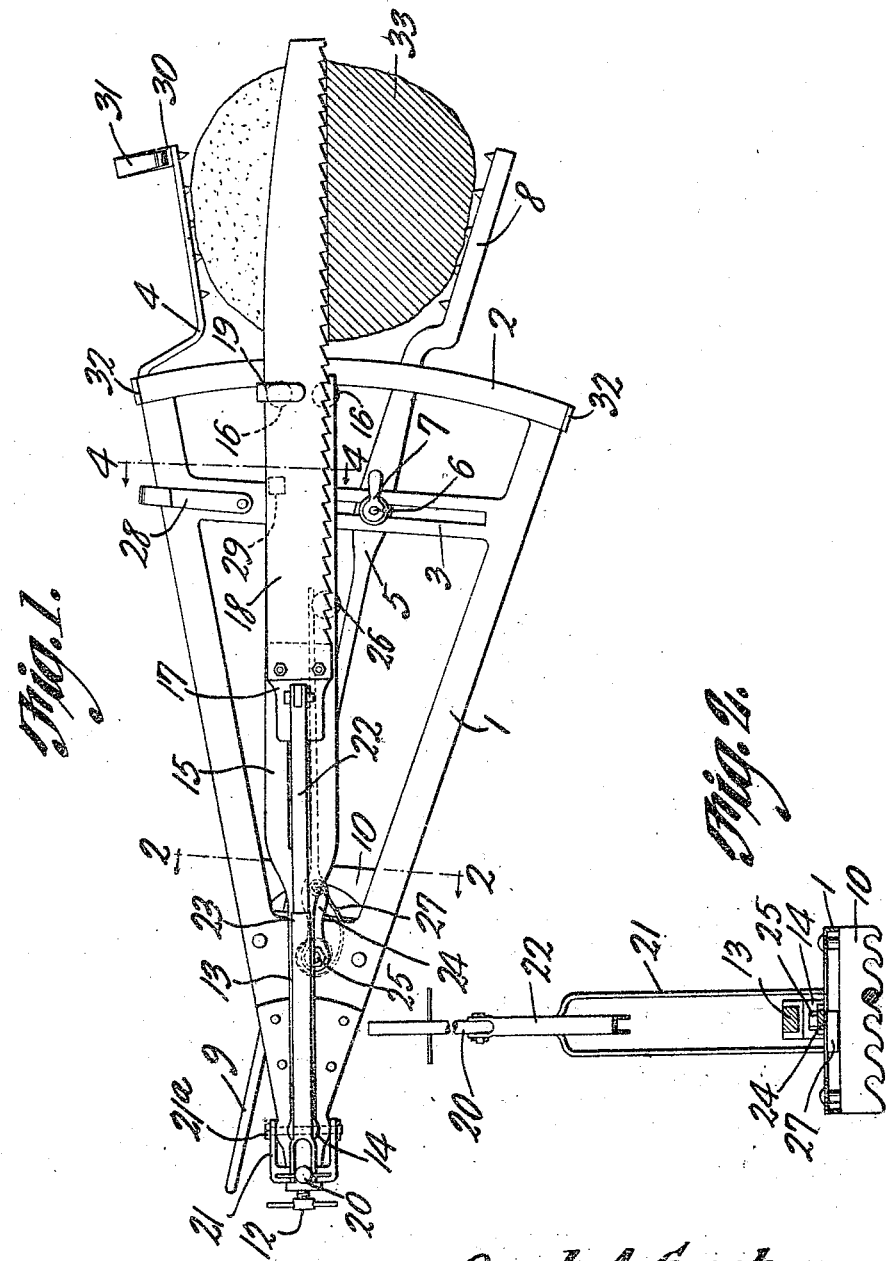
Orrel A. Gooch, Inventor
Witnesses
by _____, Attorneys O. A. GOOCH.
TREE FELLING DEVICE.
APPLICATION FILED APR. 3, 1914. RENEWED JULY 13, 1915.
1,154,624.
Patented Sept. 28, 1915.
2 SHEETS—SHEET 2.
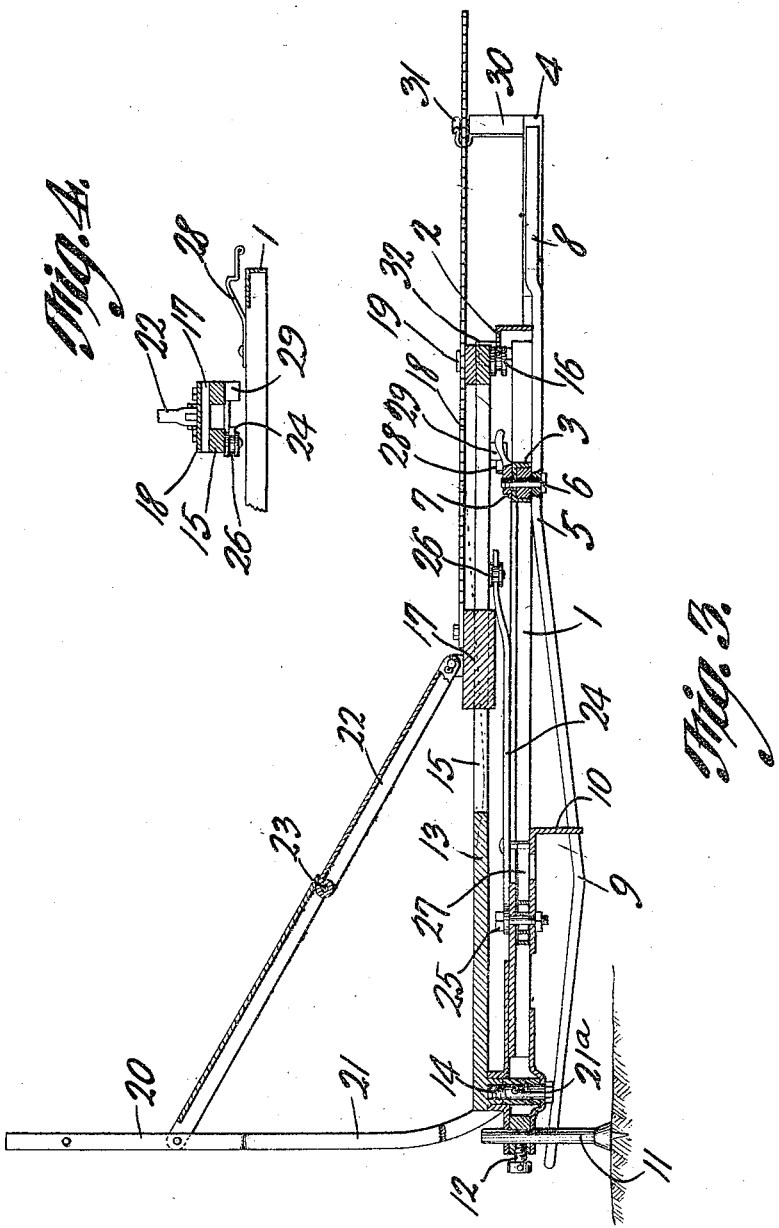
Witnesses
Orrel A. Gooch Inventor
by C.A.Snow&Co.
Attorneys

UNITED STATES PATENT OFFICE.

ORREL AUGUSTUS GOOCH, OF EAST MACHIAS, MAINE, ASSIGNOR TO FOREST KING MACHINE COMPANY, OF MACHIAS, MAINE, A CORPORATION OF MAINE.

TREE-FELLING DEVICE.

1,154,624.  Specification of Letters Patent.  Patented Sept. 28, 1915.

Application filed April 3, 1914, Serial No. 829,324. Renewed July 13, 1915. Serial No. 39,700.

*To all whom it may concern:*

Be it known that I, ORREL A. GOOCH, a citizen of the United States, residing at East Machias, in the county of Washington and State of Maine, have invented a new and useful Tree-Felling Device, of which the following is a specification.

The present invention appertains to a tree felling drag saw, and aims to provide a novel and improved portable apparatus of that character, which is particularly adapted for felling trees.

One of the objects of the present invention is to provide an apparatus of the nature indicated, embodying unique means for securing or clamping the frame of the device to the trunk of the tree, and which will be of such construction, as to enable the frame to be adjusted to accommodate various diameters of trunks, and to enable the frame to be readily applied to and removed from the trunk.

Another object of the present invention is to provide in an apparatus of the character specified, novel means for mounting the drag or cross cut saw for reciprocatory movements, and for movement transversely of the tree trunk.

A still further object of the present invention is to provide novel means for actuating or reciprocating the saw, and to provide novel means for feeding the saw as it cuts its way through the tree trunk.

The present invention also comprehends the provision of an apparatus of the nature indicated, which will be improved generally in its construction, and which embodies a novel assemblage of its component parts, whereby the utility of the apparatus will be enhanced.

It is also within the scope of the present invention to provide an apparatus of the above nature, which will be comparatively light, substantial and inexpensive in construction, which may be readily transported or conveyed from place to place when not in use, and which will be simple, convenient, durable, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein—

Figure 1 is a plan view of the improved apparatus as in use. Fig. 2 is a cross section taken on the line 2—2 of Fig. 1. Fig. 3 is a longitudinal section of the apparatus, portions being shown in full. Fig. 4 is a sectional detail taken on the line 4—4 of Fig. 1.

In carrying out the present invention, there is employed a portable sectoral or triangular shaped frame 1 lying in a horizontal plane, which may be fashioned from angle irons or other suitable materials. The side beams of the frame are arranged at an acute angle with respect to one another, and the largest or arcuate end of the frame is provided with a raised rail or guide 2. The side beams or members of the frame 1 are connected by a slotted cross piece or guide 3, adjacent the rail or guide 2.

As a means for clamping or engaging the frame 1 to the trunk of a tree, a fixed or stationary toothed jaw 4 is attached to and projects from the largest or outer end of the frame 1, adjacent one end of the rail 2 and the corresponding end of one side beam of the frame. A clamping lever 5 is fulcrumed intermediate its ends to the transverse guide or cross piece 3, by means of a bolt 6 engaged through the lever and taking through the slot of the guide 3, a tail nut 7 being threaded upon the upper end of the bolt 6 to clamp the bolt 6 at any adjusted position along the guide 3. The lever 5 lies below the frame and is arranged to swing in a horizontal plane. The outer or forward end of the lever 5 is formed with a toothed jaw 8 projecting beyond the corresponding end of the frame and coöperating with or complementing the stationary or fixed jaw 4 of the frame, and the other or rear arm of the lever 5 projects to one side of the pointed or apical end of the frame 1, to serve as a handle 9 for manipulating the lever 5. It is evident that when the bolt 6 is adjusted, the movable jaw 8 may be set at various positions relative to the stationary jaw 4, and by swinging the handle and rear arm 9 of the lever 5, the jaw 8 may be swung to and from the jaw 4 to either grasp or release the trunk of the tree, or other object to be clamped.

In order to lock the handle or inner arm 9 of the lever 5 in any position to which it is swung, when the jaw 8 is moved toward the jaw 4, a depending rack 10 is secured to the bottom of the frame 1 adjacent its inner or pointed end, the rack 10 being disposed transversely of the frame, and having its lower free edge notched for the engagement of the handle or arm 9 of the lever 5, said arm or handle 9 being adapted to be flexed downwardly out of engagement with the rack 10, when it is desired to swing the said lever. The arm 9 of the lever 5 is flexible vertically to engage and disengage the rack.

As a means for supporting the inner or apical end of the frame 1, which is remote from the clamping or gripping jaws 4 and 8, a leg or standard 11 is slidable through the inner or smallest end of the frame 1, and a set or clamping screw 12 is threaded through said end of the frame and is engageable with the leg or supporting member 11, to clamp the same at any particular adjusted position. The leg or standard 11 is adapted to rest upon the soil or any underlying object, to support the inner or rear end of the frame 1, while the outer or forward end of the frame is supported through the medium of the jaws 4 and 8, thus providing a three point support for the frame, which is desirable.

The carrier for the saw embodies an oscillatory carrier arm 13 which has one end fulcrumed or pivoted to the apical or inner end portion of the frame 1 opposite the end of the frame having the jaw 4, by means of a fulcrum or pivot member 14, journaled through the said end of the frame, the arm 13 being disposed above the frame 1 and having a longitudinal slotted guide or slide way 15. The free or forward end of the arm 13 which projects to the end of the frame having the jaw 4 is guided for oscillatory movement in a horiontal plane upon the frame, by means of a pair of rollers 16, journaled to the bottom of the free portion of the said arm 13, and engaging the edge of the rail or guide 2, whereby the arm 13 may be restrained for proper oscillatory movements over the frame.

A cross head or slide 17 is slidable within the slotted guide 15 of the arm 13, and the butt end of the drag or cross cut saw 18 is bolted or otherwise secured upon the cross head 17 and projects outwardly or forwardly from the said cross head, a guide 19 being secured to the free end of the arm 13 for the sliding reception of the inactive edge of the saw 18, whereby the saw will be guided properly when reciprocated. The saw lies in a horiontal plane.

The actuating means for the saw comprises an upwardly projecting oscillatory hand lever 20 having a fork 21 at its lower end, the fork straddling the fulcrumed portion of the carrier arm and the ends of the branches of the fork 21 being fulcrumed or pivoted to the opposite sides of the fulcrum or pivot member 14 of the arm 13, as at $21^a$, whereby the actuating lever 20 will be fulcrumed to the outer end of the arm 13, and whereby the lever 21 will swing longitudinally of the arm 13 in a vertical plane, notwithstanding the various positions of the said arm 13. The fork 21 having its branches or limbs pivoted to the opposite sides of the pivot member 14, will constrain the lever 20 to move longitudinally of the arm 13, and will restrain the lever 20 from springing or moving transversely, which would be detrimental. The upper end or handle portion of the lever 20 is adapted to be grasped by the hands of the operator, whereby the lever 20 may be actuated manually. The lever 20 is operatively connected to the cross head or slide 17, by means of a link 22, which is provided intermediate of its ends with a break or rule joint 23. It is evident that when the lever 20 is oscillated, it will swing in a plane at right angles to the plane in which the arm 13 swings and will impart a reciprocatory or rectilinear motion to the cross head 17 for actuating the saw.

The rule or break joint 23 of the link 22 is of advantage, inasmuch as when the saw 18 is slid rearwardly or inwardly, the link 22 may be folded or collapsed outwardly and forwardly, to enable the hand or actuating lever 20 to be swung downwardly upon the carrier arm, whereby the apparatus may be compactly folded for purpose of storage or transportation.

The feeding means for the saw embodies an arm or lever 24 having a fulcrum member 25 at one end journaled through the apical portion of the frame 1, adjacent the fulcrum portion of the arm 13, the free or outer end portion of the arm 24 engaging a grooved roller 26 journaled to the bottom of the arm 13. A spiral spring 27 is attached to the frame 1, and has its free end attached to the arm 24 intermediate its ends, the tension of the spring 27 tending to swing the arm 24, so as to swing the carrier arm 13 properly to feed the saw through the tree trunk.

A latch 28 is secured upon the frame 1, adjacent that side to which the fixed or stationary jaw 4 is attached, and the carrier arm 13 is provided with a depending lug or keeper 29 engageable with the latch 28, when the saw carrier 13 is swung to its initial or normal position at that side of the frame 1 having the jaw 4. Thus, when the keeper 29 of the carrier arm 13 is engaged by the latch 28, the carrier arm 13 will be held in normal or initial position against the tension of the spring 27, and as soon as the latch 28 is released, the carrier arm 13 will be swung into active position under the influence of the said spring.

The stationary or fixed jaw 4 is provided at its free or outer end, with an upstanding shank member 30 having a horizontal guide 31 at its upper end projecting angularly away from the vertical plane of the jaw 4. The guide 31 has an open slot for receiving the saw, when the saw is at its normal or initial position above the jaw 4, to enable the saw to be guided properly, when being started to the tree trunk.

The frame 1 is preferably provided with upstanding stops 32 at the ends of the rail or guide 2, for limiting the oscillatory movements of the carrier arm 13.

In operation, supposing the carrier arm 13 to be locked at initial or normal position, by the latch 28, so that the saw 18 is received by the starting guide 31, then, the frame 1 may be attached to the tree trunk 33, as seen in Fig. 1, by first properly adjusting the clamping and fulcrum bolt 6 of the lever 5, according to the diameter of the trunk, and then tightening clamping nut 7, to hold the fulcrum bolt 6 in place. When the arm or handle 9 of the lever 5 is depressed or released from the rack 10, the lever 5 may be swung, so as to open the jaws 4 and 8, whereby the jaws may be engaged over opposite sides of the trunk 33 to clamp the trunk. Then, by swinging the arm or handle 9, properly, counter clockwise, as seen in Fig. 1, the movable jaw 8 will be swung toward the stationary 4, to cause the jaws to properly clamp or grip the trunk 33. With the present device, it is possible to engage the jaws 4 and 8 to the trunk of the tree, directly adjacent the surface of the ground, it also being observed that the jaws 4 and 8 may be readily adjusted relative to each other, for accommodating tree trunks of various diameters within the range of the particular apparatus. Then, after the jaws 4 and 8 have been applied to the tree trunk, the leg or standard 11 is adjusted so that its foot rests upon the ground or underlying surface, the frame 1 being set at a horizontal position by sliding its rear or inner end upon the leg or standard 11, in which event, the set or clamping screw 12 is tightened. Consequently, the outer or forward end of the frame will be supported due to the engagement of the jaws 4 and 8 with the tree trunk while the inner or rear end of the frame will be supported by the leg or standard 11, to provide a three point support for the frame. Then, after the sections of the link 22 have been locked in alinement, as seen in Fig. 3, the latch 28 may be released from the carrier arm 13, and as a result, the spring pressed feeding arm 24 will swing the carrier arm 13 so as to bring the toothed edge of the saw 18 in contact with the side of the tree trunk. Now, by oscillating the actuating lever 20, the cross head 17 may be reciprocated, to actuate the saw 18. First, the saw will be guided by both of the guides 19 and 31, to start the saw properly into the trunk, and as soon as the saw starts to cut into the trunk, it will be retracted from the guide 31. Due to the influence of the spring 27, the carrier arm 13 will be fed properly, so as to apply sufficient pressure to the saw 18 as it cuts its way through the trunk, to properly feed the saw transversely through the trunk. The drag or cross cut saw 18, as will be apparent, is only active during the return stroke, to thereby avoid buckling of the saw, there only being a tensile strain upon the saw during the return stroke. The forward or outward stroke of the saw is utilized for clearing the saw dust from the kerf or cut, in the usual manner.

A single operator may readily operate the present apparatus, without difficulty, inasmuch as after the fulcrum or clamping bolt 6 of the lever 5 has been adjusted, the rear arm or handle 9 of the lever 5 may be actuated from a point adjacent the actuating lever 20. Thus, when the trunk of the tree is cut to such an extent, that the tree starts to fall, the operator may quickly depress the arm or handle 9 of the lever 5, so as to release it from the rack 10, whereby the jaws 4 and 8 may be opened to enable the apparatus to be quickly withdrawn from the tree trunk, so as not to be injured by the falling tree.

From the foregoing, taken in connection with the drawings, the advantages and capabilities of the present apparatus will be obvious to those versed in the art, it being observed that the present apparatus enables the trunk of the tree to be severed close to the ground, to avoid leaving a stump of considerable height, as usual, which is wasteful.

Having thus described the invention, what is claimed as new is:

A tree-felling device embodying a portable frame lying in a horizontal plane and having a jaw projecting from one end to engage one side of a tree trunk, means carried by the frame for engaging the opposite side of the tree trunk and coöperating with the said jaw to clamp the tree trunk, a carrier arm fulcrumed upon the frame opposite the said end thereof and arranged for oscillatory movement in a horizontal plane upon the frame with its free end projecting to the said end thereof, a saw lying in the horizontal plane and guided for reciprocatory movement along the carrier arm, an upstanding shank carried by the said jaw and having a horizontal guide at its upper end projecting angularly away from the vertical plane of the said jaw, the guide having an open slot to receive the saw when it is swung above the said jaw.

In testimony that I claim the foregoing as my own, I have hereto affixed my signature in the presence of two witnesses.

ORREL AUGUSTUS GOOCH.

Witnesses:
ANDREW F. GARDNER,
ELMER E. GARDNER.